(12) United States Patent
Favrot et al.

(10) Patent No.: US 12,522,025 B2
(45) Date of Patent: Jan. 13, 2026

(54) RAPID WARM-UP TIRE

(71) Applicant: COMPAGNIE GENERALE DES ETABLISSEMENTS MICHELIN, Clermont-Ferrand (FR)

(72) Inventors: Romain Favrot, Clermont-Ferrand (FR); Florian Mora, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/834,862

(22) PCT Filed: Jan. 10, 2023

(86) PCT No.: PCT/EP2023/050479
§ 371 (c)(1),
(2) Date: Jul. 31, 2024

(87) PCT Pub. No.: WO2023/147968
PCT Pub. Date: Aug. 10, 2023

(65) Prior Publication Data
US 2025/0033419 A1 Jan. 30, 2025

(30) Foreign Application Priority Data
Feb. 4, 2022 (FR) ........................... 2200981

(51) Int. Cl.
*B60C 11/00* (2006.01)
*B60C 11/03* (2006.01)

(52) U.S. Cl.
CPC ........ *B60C 11/033* (2013.01); *B60C 2200/04* (2013.01); *B60C 2200/10* (2013.01)

(58) Field of Classification Search
CPC ............ B60C 11/0083; B60C 11/1376; B60C 11/0332; B60C 2011/0334
See application file for complete search history.

(56) References Cited

U.S. PATENT DOCUMENTS 3,765,977 A * 10/1973 Knight ...................... B60C 3/04
264/315
4,722,378 A * 2/1988 Carolla ............... B60C 11/0302
152/209.15

(Continued)

FOREIGN PATENT DOCUMENTS

FR 3094270 A1 10/2020

OTHER PUBLICATIONS

International Search Report dated Mar. 14, 2023, in corresponding PCT/EP2023/050479 (6 pages).

*Primary Examiner* — Kendra Ly
(74) *Attorney, Agent, or Firm* — VENABLE LLP

(57) ABSTRACT

A tire for use on an asphalted surface comprises a tread surface (16) comprising a continuously-smooth part (20). The or each continuously-smooth part (20) comprises a plurality of recessed portions (26) and a plurality of raised portions (28). The recessed portions (26) and the raised portions (28) are arranged in such a way that, when the continuously-smooth part (20) rolls along a surface, the mean top-of-raised-portion pressure exerted on average by that surface on the tops (32) of the raised portions (28) is strictly greater than the mean bottom-of-recessed-portion pressure exerted on average by that surface on the bottoms (30) of the recessed portions (26).

14 Claims, 10 Drawing Sheets

(56) References Cited

U.S. PATENT DOCUMENTS

| | | |
|---|---|---|
| 6,540,858 B1 | 4/2003 | Caretta et al. |
| 7,762,296 B2 | 7/2010 | Ganz et al. |
| 9,776,456 B2 | 10/2017 | Sandstrom et al. |
| 2001/0047840 A1 | 12/2001 | Nanni et al. |
| 2005/0034797 A1 | 2/2005 | Nanni et al. |
| 2008/0257465 A1 | 10/2008 | Nanni et al. |
| 2008/0289737 A1 | 11/2008 | Ganz et al. |
| 2011/0146861 A1 | 6/2011 | Nanni et al. |
| 2022/0194132 A1 | 6/2022 | Perrin et al. |

* cited by examiner

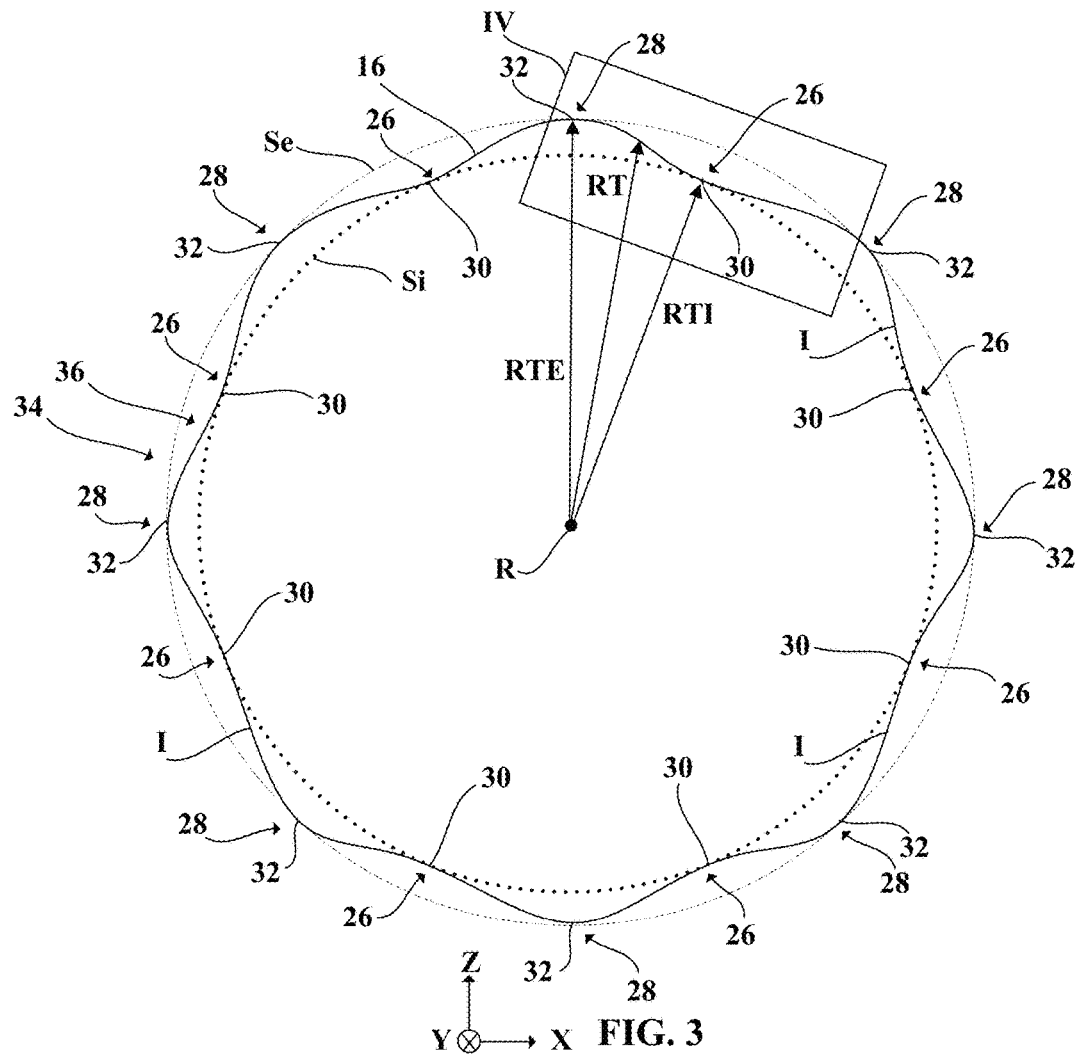
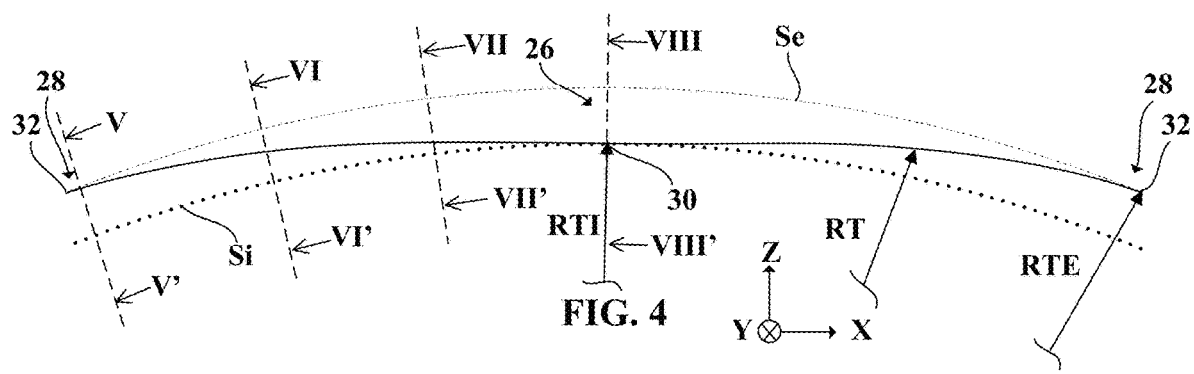

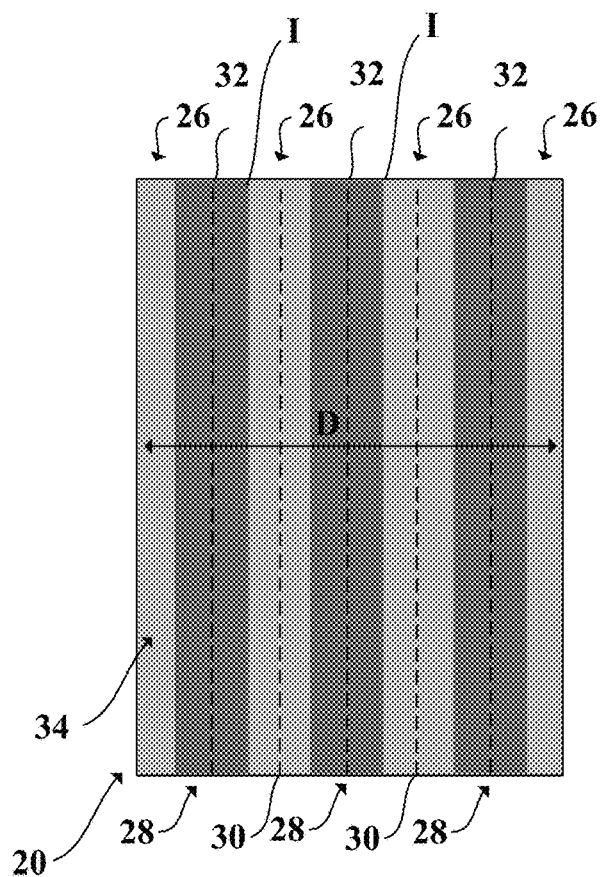
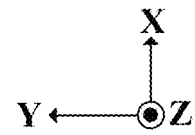
FIG. 11
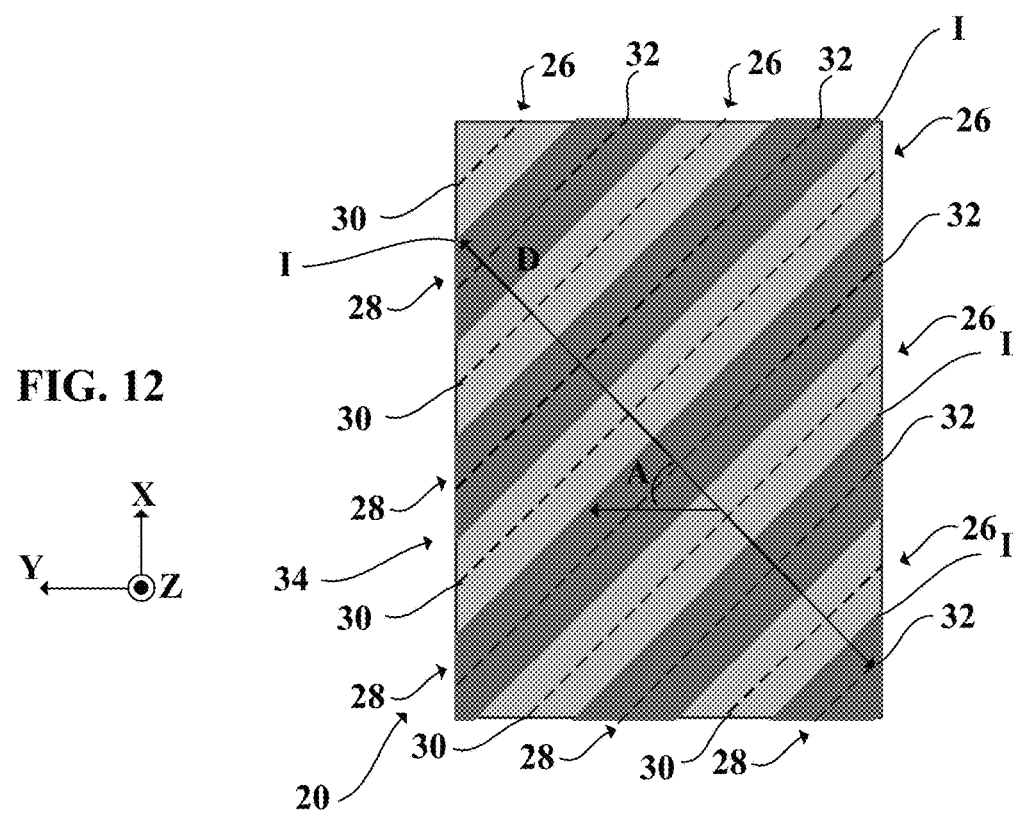
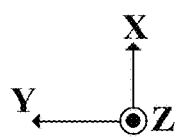
FIG. 12

RAPID WARM-UP TIRE

BACKGROUND

The present invention relates to a tyre and to a mould. A tyre is to be understood to mean a casing intended to form an internal cavity by cooperating with a support element of the wheel-tyre assembly, this internal cavity being able to be pressurized to a pressure higher than atmospheric pressure.

Competition tyres for racing cars and for racing motorbikes are known in the prior art.

In motor competitions, the car drivers or bike riders wish to have tyres that exhibit optimal performance, notably grip, throughout the entire duration of use of the tyres, namely from the start of the race or from the time that they are fitted to the vehicle, to the end or until the tyres are changed. One of the essential parameters in obtaining this optimal performance is the tyre temperature which needs to reach a value referred to as the operating temperature that guarantees this optimal performance.

Thus, in certain races, prior to being fitted to the vehicle, the tyres have their temperature raised by heating, for example using heating devices comprising heating tyre blankets that are wrapped around the tyres. Such heating devices on the one hand are expensive and restrictive, and on the other hand consume energy.

In other instances, no heating device is used, which means that there is a delay in reaching the operating temperature and therefore in obtaining optimal performance.

It is an object of the invention to allow optimal performance to be obtained in a more economical and environmentally-friendly manner, or more rapidly during a race.

SUMMARY

Thus, one subject of the invention is a tyre for a motor car or a motorbike for use on an asphalted surface, comprising a tread surface comprising one or more continuously-smooth part(s), wherein the or each continuously-smooth part comprises:
- a plurality of recessed portions, each recessed portion of the plurality of recessed portions comprising a recessed-portion bottom,
- a plurality of raised portions, each raised portion of the plurality of raised portions comprising a raised-portion top, the recessed portions of the pluralities of recessed portions and the raised portions of the plurality of raised portions are arranged in such a way that, when the or each continuously-smooth part rolls along a surface, the mean top-of-raised-portion pressure exerted on average by that surface on the tops of the raised portions of the plurality of raised portions is strictly greater than the mean bottom-of-recessed-portion pressure exerted on average by that surface on the bottoms of the recessed portions of the plurality of recessed portions, the mean bottom-of-recessed-portion pressure being non-zero, the pressure exerted by that surface on each recessed portion of the plurality of recessed portions and on each raised portion of the plurality of raised portions being measured in the contact patch of the or each continuously-smooth part of the tyre, the tyre running at a speed equal to 100 mm/sec with substantially zero slip and camber angles, the tyre being inflated to a reference pressure equal to 1.6 bar, and subjected to a reference load equal to 5000 N in the case of a car tyre, the tyre being inflated to a reference pressure equal to 1.8 bar, and subjected to a reference load equal to 1500 N in the case of a motorbike tyre.

Since the mean pressure on the raised portions is strictly greater than the mean pressure on the recessed portions, the radial and tangential deformations imposed on the raised portions are greater than those imposed on the tread surface of a tyre of the prior art in which the equivalent mean pressure is substantially uniform across the tread surface. By imposing relatively high levels of deformation, overpressures are created locally on the raised portions, thereby warming up the tyre according to the invention. The temperature of the tyre is thus rapidly increased, notably right from the first few moments of running of this tyre.

Unlike in tyres of the prior art in which the smooth part or parts have, in the mid-plane and in each para-sagittal plane, a transverse radius that is substantially constant, the recessed portions of said smooth part of the tyre according to the invention have a mean transverse radius that is strictly smaller than the mean transverse radius of the raised portions of said smooth part, the transverse radius being the radial distance between the axis of rotation and a point on said smooth part. The mean transverse radius being, for each set of recessed and raised portions, the arithmetic mean of the transverse radii of each set.

Thus, unlike in tyres of the prior art which are heated by external heating devices, the tyre according to the invention heats itself upon contact with the ground surface, thereby making it possible to obtain the expected optimal performance in a manner that is economical and environmentally-friendly since there is no need to resort to expensive, restrictive and energy-consuming external heating devices.

Furthermore, in instances where an external heating device would not be used, the invention allows the tyre to reach its operating temperature more rapidly compared with a tyre of the prior art thus allowing the driver or rider the benefit of the optimum performance more rapidly during the course of the race.

The invention is not characterized by the overpressures usually observed on the axially outermost shoulder parts of the tyre. Specifically, because of the curvature of a tyre, the axially outermost shoulder parts generally form recessed portions because these axially outermost shoulder parts generally have a smaller transverse radius than the axially central part. Thus, the mere fact that these axially outermost shoulder parts experience overpressures is not enough for these parts to constitute, for this reason alone, raised portions of the tyre according to the invention. If, contrary to that which is generally observed, these axially outermost shoulder parts were to form raised portions and therefore give rise to overpressures, then these axially outermost shoulder parts would of course form raised portions in accordance with the invention.

The invention applies both to motorcar tyres and to motorbike tyres.

The fact that the tyre is intended for use on an asphalted road surface, whether this be a closed racetrack or an open road, is an essential feature for enabling the overpressures to be created locally on the raised portions. Specifically, a loose road surface, for example such as dirt, would not enable significant overpressures to be created. Thus, off-road rally tyres do not form part of the invention. In particular, off-road rally competition tyres do not form part of the invention.

Of course, the invention applies to a tyre both when new and when worn, whether fully worn or partially worn. Given the invention and its application, it is preferable to use it on a new tyre.

The or each continuously-smooth part comprises a plurality of recessed portions and a plurality of raised portions, which is to say that the or each continuously-smooth part comprises at least two recessed portions and at least two raised portions. Thus, the continuously-smooth part or the collection of continuously-smooth parts will comprise a greater or lower number of recessed and raised portions, depending on the embodiment. Depending on the orientation and layout of the recessed and raised portions, there may for example be from 2 to 600 recessed portions and from 2 to 600 raised portions over the continuously-smooth part or the collection of continuously-smooth parts. In certain embodiments in which there are a low number of recessed and raised portions, the continuously-smooth part or the collection of continuously-smooth parts comprises from 2 to 10 recessed portions and from 2 to 10 raised portions. In other embodiments in which there are a high number of recessed and raised portions, the continuously-smooth part or the collection of continuously-smooth parts comprises from 10 to 600 recessed portions and from 10 to 600 raised portions.

A person skilled in the art will know how to adapt the raised and recessed portions according to the properties of the tread, notably the stiffness thereof. Specifically, the stiffer the tread, the less easy it is for the tread to flatten, so that the overpressures on the tops of the raised portions will be greater. Thus, in the case of a relatively stiff tread the mean amplitude between the tops of the raised portions and the bottoms of the recessed portions will preferably be kept relatively small so as to have an overpressure that is sufficient without being needlessly excessive. By contrast, the more flexible the tread, the easier it is for the tread to flatten, so that the overpressures on the tops of the raised portions will be lower. Thus, in the case of a relatively flexible tread the mean amplitude between the tops of the raised portions and the bottoms of the recessed portions will preferably be as great as it is desired for the overpressure to be.

As a preference, although this is not an essential feature of the invention, it will be contrived for the tyre to be such that any contact patch obtained under the above-mentioned conditions contains at least 2 recessed portions and 2 raised portions.

When two smooth parts of the tread surface are at least partially touching and connected to one another by a smooth part in common, these connected smooth parts will be considered to be fully connected and to form one and the same single continuously-smooth part. By contrast, when two smooth parts of the tread surface are fully disconnected from one another and separated from one another by a non-smooth part, these two smooth parts will be considered to be two distinct continuously-smooth parts.

A smooth part is a part of the tread surface that comprises nothing in relief on the tread surface, notably no tread wear indicator and no grooving. Such tread wear indicators or such grooving form for example a discontinuity or an abrupt break in curvature of the tread surface.

The invention therefore applies to tyres of which the tread surface is made up of a single smooth part, and also to tyres of which the tread surface comprises one or more smooth parts and one or more non-smooth parts. One or such non-smooth part(s) may comprise elements in relief, for example tread wear indicators, grooving for removing or storing water, cuts moulded in the form of vents for removing air trapped between the tyre curing mould and the tread surface during the tyre manufacturing process or else flash resulting from moulding. In other words, each smooth part is completely free of such elements in relief which may for example be tread wear indicators, grooving for removing or storing water, cuts moulded in the form of vents for removing air trapped between the tyre curing mould and the tread surface during the tyre manufacturing process or else flash resulting from moulding.

The recessed portions of the plurality of recessed portions of the tyre do not have the removal or storage of water as their essential function, nor do they have as their essential function anything that might be associated with the removal of air trapped between the tyre curing mould and the tread surface during the tyre manufacturing process.

The tread surface is the part of the tyre intended to come into contact with the surface of the ground when the tyre is running. The surface area of the tread surface is the magnitude of the surface of revolution of a tyre that is delimited by the axial ends of the tread surface. It is possible for example to make a profile record in order to measure this surface area. For a car tyre, it is also possible to measure the axial width of the tyre and multiply this by the maximum circumference measured in the mid-plane of the tyre.

In the case of a tyre according to the invention, the surface area(s) formed by the or each continuously-smooth part is determined by calculating, on a non-inflated and unladen tyre, the surface area of each of this or these continuously-smooth part(s), for example using imaging.

Each recessed portion and each raised portion of the or each continuously-smooth part is defined with respect to a mean surface of revolution of axis of revolution substantially coincident with the axis of rotation of the tyre, the mean surface of revolution being equidistant from the bottoms of the recessed portions and from the tops of the raised portions. Thus, any part radially on the outside of the mean surface of revolution is a raised portion, whereas any part radially on the inside of the mean surface of revolution is a recessed portion. The or each continuously-smooth part may therefore also comprise one or more mean parts substantially coincident with the mean surface of revolution.

The recessed portions or the raised portions may have various shapes. Thus, it is possible to have recessed portions and raised portions that have a rounded profile. It is also possible to have recessed portions and raised portions that have a profile exhibiting sharp corners and/or rectilinear parts, for example a trapezoidal profile, the tops of the raised portions and the bottoms of the recessed portions then being formed by profiles that are substantially rectilinear.

The mean top-of-raised-portion pressure is equal to the arithmetic mean of the pressures measured on the tops of the raised portions of the or each continuously-smooth part. Similarly, the mean bottom-of-recessed-portion pressure is equal to the arithmetic mean of the pressures measured on the bottoms of the recessed portions of the or each continuously-smooth part. In order to measure the pressures at the tops of the raised portions and at the bottoms of the recessed portions of the or each continuously-smooth part, use may be made of means known to those skilled in the art, such as those described for example in WO2017109377, or else such as those marketed by the company Tekscan Inc. under the name of TireScan CrossDrive System. As a preference, the ground surface used for taking the measurements will be flat, smooth and rigid, as notably described in WO2017109377.

It would also, and preferentially, be possible to determine the mean top-of-raised-portion pressure by considering only the highest 25% of the pressures measured at the tops of the raised portions of the or each smooth part and to determine the mean bottom-of-recessed-portion pressure by considering only the lowest 25% of the pressures measured at the bottoms of the recessed portions of the or each smooth part.

In order to avoid edge effects, notably in instances in which the continuously-smooth part is delimited at least in part by the edges of the contact patch of the tyre, the pressures will be determined in a central region of the contact patch of the continuously-smooth part. This central region has an axial width equal to 50% of the width of said continuously-smooth part and centred axially on the mid-plane of said continuously-smooth part, and a length equal to 50% of the length of said continuously-smooth part and centred longitudinally on the transverse plane of said continuously-smooth part.

The tyre according to the invention has a substantially toric shape about an axis of revolution substantially coincident with the axis of rotation of the tyre. This axis of revolution defines three directions conventionally used by those skilled in the art: an axial direction, a circumferential direction and a radial direction.

Axial direction is given to mean the direction substantially parallel to the axis of revolution of the tyre, that is, the axis of rotation of the tyre.

Circumferential direction is given to mean the direction substantially perpendicular both to the axial direction and to a radius of the tyre (in other words, tangent to a circle centred on the axis of rotation of the tyre).

Radial direction is given to mean the direction along a radius of the tyre, that is, any direction that intersects the axis of rotation of the tyre and is substantially perpendicular to that axis.

Mid-plane of the tyre (denoted M) is given to mean the plane perpendicular to the axis of rotation of the tyre, which is situated axially halfway between the two beads and passes through the axial middle of the crown reinforcement.

Equatorial circumferential surface of the tyre is given to mean, in a meridian plane of section, the surface passing through the equator of the tyre, perpendicular to the mid-plane and to the radial direction. The equator of the tyre is, in a meridian plane of section (plane perpendicular to the circumferential direction and parallel to the radial and axial directions), the axis that is parallel to the axis of rotation of the tyre and situated equidistantly between the radially outermost point of the tread that is intended to be in contact with the ground and the radially innermost point of the tyre that is intended to be in contact with a support, for example a rim.

Meridian plane is given to mean a plane parallel to and containing the axis of rotation of the tyre and perpendicular to the circumferential direction.

Radially inner/inside and radially outer/outside are given to mean closer to the axis of rotation of the tyre and further away from the axis of rotation of the tyre, respectively. Axially inner/inside and axially outer/outside are given to mean closer to the median plane of the tyre and further away from the mid-plane of the tyre, respectively.

Bead is given to mean the radial portion of the tyre intended to allow the tyre to be attached to a mounting support, for example a wheel comprising a rim. Thus, each bead is notably intended to be in contact with a flange of the rim allowing it to be attached.

Any range of values denoted by the expression "between a and b" represents the range of values extending from more than a to less than b (that is, excluding the end-points a and b), whereas any range of values denoted by the expression "from a to b" means the range of values extending from a to b (that is, including the strict end-points a and b).

Highly preferably, the tyre is a competition tyre. A competition tyre sometimes has markings designating it exclusively for use in competition, for example "for competition purposes only", or "usage compétition exclusivement".

Most competition tyres are not subject to homologation in accordance with UN/ECE Regulation No. 30 or UN/ECE Regulation No. 117, and therefore do not bear corresponding markings.

Nevertheless, certain competition tyres, notably certain rally tyres, do have homologation markings for UN/ECE R30, although that does not extend their use to allow use outside of competition.

Competition notably covers officially-timed events and does not cover free running on racetracks, sometimes known as "track days" or "HDPE" (High Driving Performance Events), which covers events that are not officially timed.

In some embodiments applicable to most of the tyres used in competition, in which the smooth parts are relatively sizeable, the or each continuously-smooth part forms, on the surface, at least 10%, preferably at least 20%, more preferentially at least 30% and more preferentially still at least 40% of the tread surface.

Among the tyres used in competition, notably in competition on a racetrack, tyres are distinguished from one another according to the weather conditions in which they are used. Thus, a distinction is made notably between smooth tyres known as "slicks" which are intended to be used in the dry, intermediate tyres known as "intermediates" which are intended to be used when the track is wet but it is not raining, and tyres known as rain tyres or "wets" which are intended to be used on a wet track in the rain.

In certain embodiments applicable to slick tyres, the continuously-smooth part or the collection of continuously-smooth parts forms, on the surface, at least 80%, preferably at least 90%, and more preferentially at least 95% of the tread surface. In other words, the tread surface void ratio by area is strictly less than 20%, preferably than 10% and more preferentially than 5%. Specifically, unlike intermediate tyres and rain tyres which comprise a significant proportion of relief elements, notably grooving to remove or store water, slick tyres have little or nothing by way of relief elements.

In other embodiments applicable to intermediate tyres, the continuously-smooth part or the collection of continuously-smooth parts forms, on the surface, from 80% to 99%, preferably from 85% to 95% of the tread surface. In other words, the tread surface void ratio by area ranges from 1% to 20%, preferably from 5% to 15%.

In yet other embodiments applicable to rain tyres (wets), the continuously-smooth part or the collection of continuously-smooth parts forms, on the surface, from 50% to 80%, preferably from 70% to 80% of the tread surface. In other words, the tread surface void ratio by area ranges from 20% to 50%, preferably from 20% to 30%.

In order to optimize the warming-up of the tyre, the ratio of the mean top-of-raised-portion pressure to the mean bottom-of-recessed-portion pressure is greater than or equal to 1.5, preferably greater than or equal to 2.0 and more preferentially greater than or equal to 2.5.

In order not to excessively penalize the flattening of the tyre and therefore the grip, the ratio of the mean top-of-raised-portion pressure to the mean bottom-of-recessed-portion pressure is less than or equal to 14.0, preferably less than or equal to 10.0 and more preferentially less than or equal to 7.0.

In embodiments in which the raised and recessed portions are geometrically characterized in such a way as to optimize the trade-off between the warming-up of the tyre and the flattening of the tyre and therefore the grip thereof, in a central portion of the tread surface that has an axial width equal to 50% of the axial width of the tread surface and is axially centred on the mid-plane of the tyre, the mean radial distance between the top of each raised portion and the bottom of each recessed portion ranges from 0.1 mm to 1.5 mm, preferably from 0.2 to 1.0 mm, and more preferentially from 0.3 mm to 0.7 mm. Specifically, if the mean radial distance is too small, the overpressure created on each raised portion does allow the tyre to be warmed up, but only relatively slowly. If the mean radial distance is too great, the overpressure is great, but this may reduce the surface area of the contact patch and therefore the grip of the tyre. Furthermore, with too great a mean radial distance there is a risk of creating vibrations, which is undesirable.

The mean radial distance is calculated by finding the difference between the arithmetic mean of the transverse radii of the top(s) of each raised portion of the central portion and the arithmetic mean of the transverse radii of the bottom(s) of each recessed portion of the central portion.

In certain embodiments, each recessed portion of the plurality of recessed portions of said continuously-smooth part and each raised portion of the plurality of raised portions of said continuously-smooth part extends axially over at least 50%, preferably at least 80%, and more preferentially at least 90% of the axial width of said continuously-smooth part. Thus, because of a relatively great axial coverage, the tyre warms up over a relatively significant axial width of the or each continuously-smooth part, and this contributes to the obtaining of optimal performance over a significant area of the tread surface.

In certain embodiments, the recessed portions of the plurality of recessed portions are distributed in at least one repeating pattern of recessed portions over at least a portion of said continuously-smooth part and/or the raised portions of the plurality of raised portions are distributed in at least one repeating pattern of raised portions over at least a portion of said continuously-smooth part.

What is meant by a pattern is that the recessed portions or the raised portions are geometrically substantially identical, which is to say have dimensions and shapes that are substantially identical whatever their distribution relative to one another.

A repeating pattern is a collection of recessed portions or of raised portions that are geometrically substantially identical and of which the distribution with respect to one another is organized, as opposed to random, over said continuously-smooth part. This distribution, although organized, does not necessarily have to remain constant and may therefore be variable. One example of a constant distribution is an arrangement whereby the recessed portions and/or the raised portions are pairwise equidistant from one another. One example of a variable distribution is an arrangement whereby the recessed portions and/or the raised portions are pairwise distant from one another by a distance that is variable, for example by distance that increases with increasing distance away from the mid-plane of the tyre.

The repeating pattern of recessed portions and the repeating pattern of raised portions may be identical or else different but are preferably identical.

In a variant, the recessed portions of the plurality of recessed portions are distributed in:
  a first repeating pattern of recessed portions over a first portion of said continuously-smooth part, and
  a second repeating pattern of recessed portions, different from the first repeating pattern of recessed portions, over a second portion of said continuously-smooth part.

Similarly, in a variant, the raised portions of the plurality of raised portions are distributed in:
  a first repeating pattern of raised portions over a first portion of said continuously-smooth part, and
  a second repeating pattern of raised portions, different from the first repeating pattern of raised portions, over a second portion of said continuously-smooth part.

In a preferred variant, the recessed portions of the plurality of recessed portions and the raised portions of the plurality of raised portions are distributed in a single common repeating pattern over at least a portion of said continuously-smooth part.

In other embodiments, the recessed portions of the plurality of recessed portions are distributed randomly over said continuously-smooth part and/or the raised portions of the plurality of raised portions are distributed randomly over said continuously-smooth part.

Advantageously, although this is not essential to the invention, the recessed portions of the plurality of recessed portions and the raised portions of the plurality of raised portions are arranged in such a way as to form at least one undulating portion of said continuously-smooth part.

What is meant by an undulating portion is a portion of said continuously-smooth part that comprises troughs (bottoms) and crests (tops) that alternate successively with one another so as to give rise to several changes in sign of the curvature of the tread surface.

In a variant, said continuously-smooth part consists of an undulating portion. In another variant, said continuously-smooth part comprises an undulating portion and a non-undulating portion. One example of a non-undulating portion is a planar portion or else a portion in which the sign of the curvature is constant, for example a portion that is wholly concave or wholly convex.

In certain embodiments, the or each undulating portion comprises at least one repeating undulation of said continuously-smooth portion, the or each repeating undulation being oriented in a main direction substantially parallel to the direction of translation from one recessed portion to another of the plurality of recessed portions of the undulating portion, or to the direction of translation from one raised portion to another of the plurality of raised portions of the undulating portion, these recessed/raised portions being distributed in the common repeating pattern.

An undulation comprises several successive changes to the direction of curvature of said continuously-smooth surface along the main direction, each change in the direction of curvature being located on one, and only one, point of inflection arranged along the main direction between each successive top of a raised portion and bottom of a recessed portion.

A repeating undulation corresponds to an undulation between recessed portions and raised portions of identical shapes and sizes, through the fact that the recessed portions and the raised portions define a common repeating pattern.

The direction of the repeating undulation may be rectilinear or curvilinear. Because of its repeating nature, the repeating undulation may also be characterized by a constant period.

In certain variants, the undulating portion comprises a single repeating undulation. In other variants, the undulating portion comprises first and second repeating undulations having respective first and second main directions that are different from one another.

In other embodiments, the or each undulating portion comprises at least one random undulation of said continuously-smooth surface. Such a random undulation is notably used in instances in which the recessed portions of the plurality of recessed portions and the raised portions of the plurality of raised portions are not distributed in a single common repeating pattern.

In preferred embodiments, with the main direction of the or each repeating undulation being substantially rectilinear, the main direction of the or each repeating undulation makes an angle greater than or equal to 45°, preferably greater than or equal to 80° with the axial direction of the tyre.

The angle considered is of course the smaller of the angles between the main direction and the axial direction.

Because tyre wear, particularly competition tyre wear, is essentially connected with the particularly high transverse loadings, it is preferable for the direction of the undulation to be oriented to the least possible extent in the direction of these transverse loadings (namely to be oriented to the least possible extent in the axial direction of the tyre) so as to promote even tyre wear. Furthermore, having the direction of undulation oriented too closely toward the axial direction of the tyre would lead to a loss in the initial cornering stiffness of the tyre.

In a variant of the above preferred embodiment, said continuously-smooth part contains, on average, from 0.10 to 0.40 recessed portions and from 0.10 to 0.40 raised portions per cm in the circumferential direction of said continuously-smooth surface. In order to determine the mean number of recessed portions and of raised portions per cm in the circumferential direction, the circumference of the tyre in the mid-plane of the tyre is measured along with the numbers of recessed portions and of raised portions in said continuously-smooth part, and the aforesaid numbers are prorated to one centimetre of the measured circumference.

In certain embodiments, the or each undulation preferentially has a constant period. Preferentially, in order to avoid any problems with resonance, care is taken to avoid the period of the or each undulation being too close to the natural period of resonance of the vehicle suspension. In other, more complex, embodiments, the or each undulation has a variable period.

Another subject of the invention is the use, in competition or free running on a racetrack, on an asphalted surface, of a tyre comprising a tread surface comprising one or more continuously-smooth part(s), wherein the or each continuously-smooth part comprises:
  a plurality of recessed portions, each recessed portion of the plurality of recessed portions comprising a recessed-portion bottom,
  a plurality of raised portions, each raised portion of the plurality of raised portions comprising a raised-portion top,
the recessed portions of the pluralities of recessed portions and the raised portions of the plurality of raised portions are arranged in such a way that, when the or each continuously-smooth part rolls along a surface, the mean top-of-raised-portion pressure exerted on average by that surface on the tops of the raised portions of the plurality of raised portions is strictly greater than the mean bottom-of-recessed-portion pressure exerted on average by that surface on the bottoms of the recessed portions of the plurality of recessed portions, the mean bottom-of-recessed-portion pressure being non-zero,
the pressure exerted by that surface on each recessed portion of the plurality of recessed portions and on each raised portion of the plurality of raised portions being measured in the contact patch of the or each continuously-smooth part of the tyre, the tyre running at a speed equal to 100 mm/sec with substantially zero slip and camber angles,
  the tyre being inflated to a reference pressure equal to 1.6 bar, and subjected to a reference load equal to 5000 N in the case of a car tyre,
  the tyre being inflated to a reference pressure equal to 1.8 bar, and subjected to a reference load equal to 1500 N in the case of a motorbike tyre.

Whether for competition use or for free running on the racetrack, the use notably covers motor car or motorbike competitive events or free running on a car or motorbike racetrack.

Competition notably covers officially-timed events whereas free running on racetracks, sometimes known as "track days" or "HDPE" (High Driving Performance Events), covers events that are not officially timed.

Another subject of the invention is a mould for manufacturing a tyre as defined hereinabove, comprising a moulding surface for moulding the tread surface comprising a continuously-smooth moulding part for moulding the or each continuously-smooth part of the tread surface; the or each continuously-smooth moulding part comprises:
  a plurality of recesses for moulding the raised portions of the plurality of raised portions of said continuously-smooth part of the tread surface, and
  a plurality of raised portions for moulding the recessed portions of the plurality of recessed portions of said continuously-smooth part of the tread surface.

In particularly advantageous embodiments that facilitate the removal of any air trapped between the tyre mould and the tread surface during the tyre manufacturing process, the mould comprises a plurality of venting elements for venting from the mould any air that is trapped between the moulding surface and the tread surface when the tyre is in the mould, each venting element of at least part of the venting elements opens radially into one of the moulding recesses.

During the moulding of the tyre by the mould, the moulding surface first of all comes into contact with the tread surface via the raised moulding portions and then comes into contact with the tread surface via the moulding recesses. Trapped air is therefore concentrated mainly between the moulding recesses and the tread surface, in the form of air pockets. By positioning the venting elements in such a way that they open into the moulding recesses it is possible to ensure that these will remove the trapped air.

In mould variants in which the mould comprises a plurality of individual tread-surface moulding elements able to collaborate in pairs along parting lines, each parting line of at least part of the parting lines opens radially on to one of the moulding recesses. In these variants, the parting lines are used to form the venting elements.

Optionally and highly advantageously, each moulding recess has at least one venting element of at least part of the venting elements opening into said moulding recess. Thus it can be ensured that air trapped in each recess is removed by a venting element.

In the variants in which the mould comprises a plurality of individual tread-surface moulding elements able to collaborate in pairs along parting lines, each moulding recess has a parting line of at least part of the parting lines opening into said moulding recess.

BRIEF DESCRIPTION OF THE FIGURES

The invention will be better understood on reading the following description, which is given purely by way of nonlimiting example and with reference to the drawings, in which:

FIG. 3 is a schematic view of the tyre of FIG. 1 in the plane of section III-III' of FIG. 1, FIG. 4 is a detail view of the region IV of FIG. 3, FIGS. 5, 6, 7 and 8 are schematic views of the tyre of FIG. 4 respectively on the planes of section V-V', VI-VI', VII-VII' and VIII-VIII'.

DETAILED DESCRIPTION

A frame of reference X, Y, Z corresponding to the usual axial (Y), radial (Z) and circumferential (X) directions, respectively, of a tyre is shown in the figures.

Figure 1:
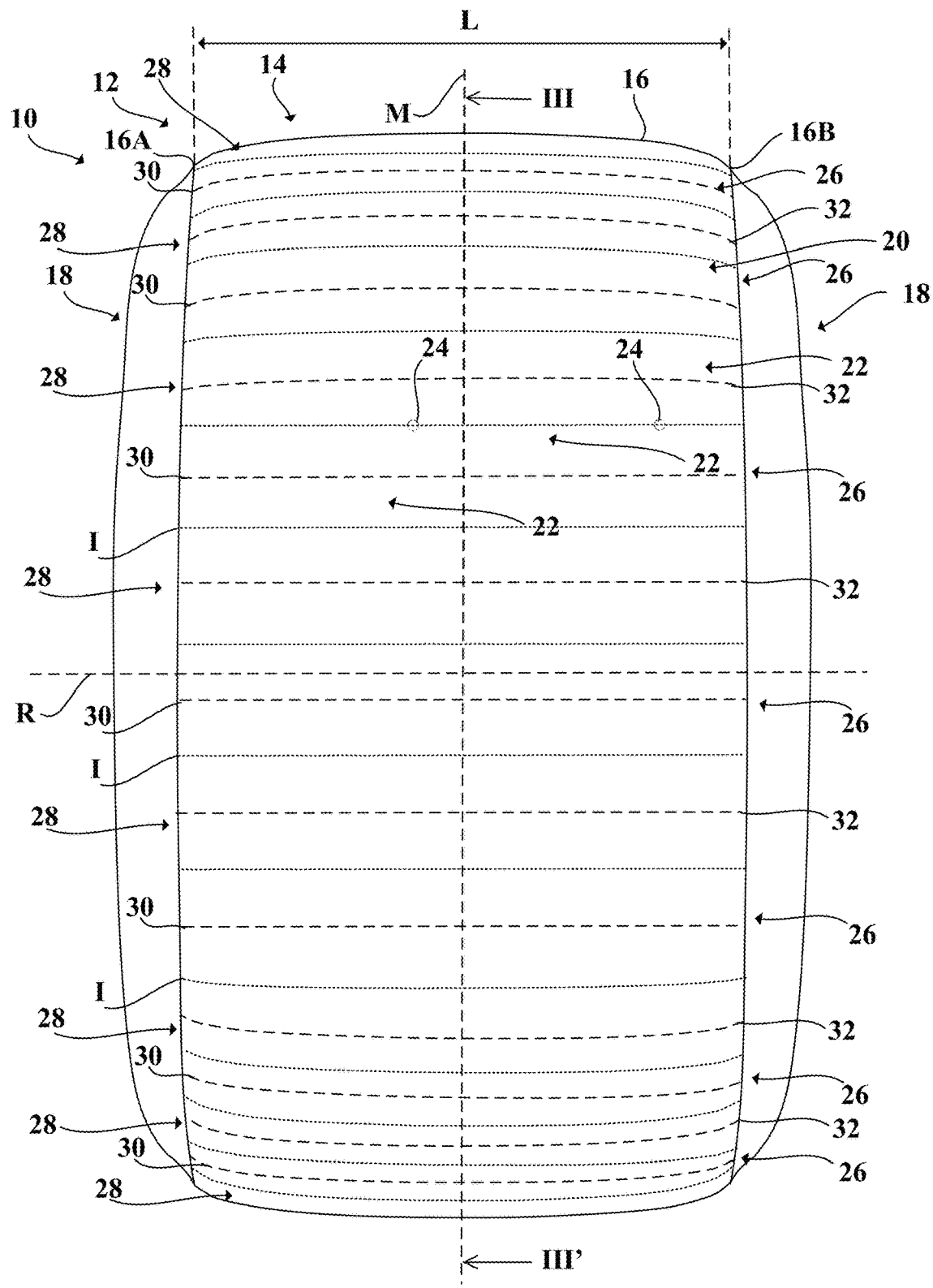
FIG. 1 is a face-on view of a competition car tyre according to a first embodiment of the invention.
Figure 2:
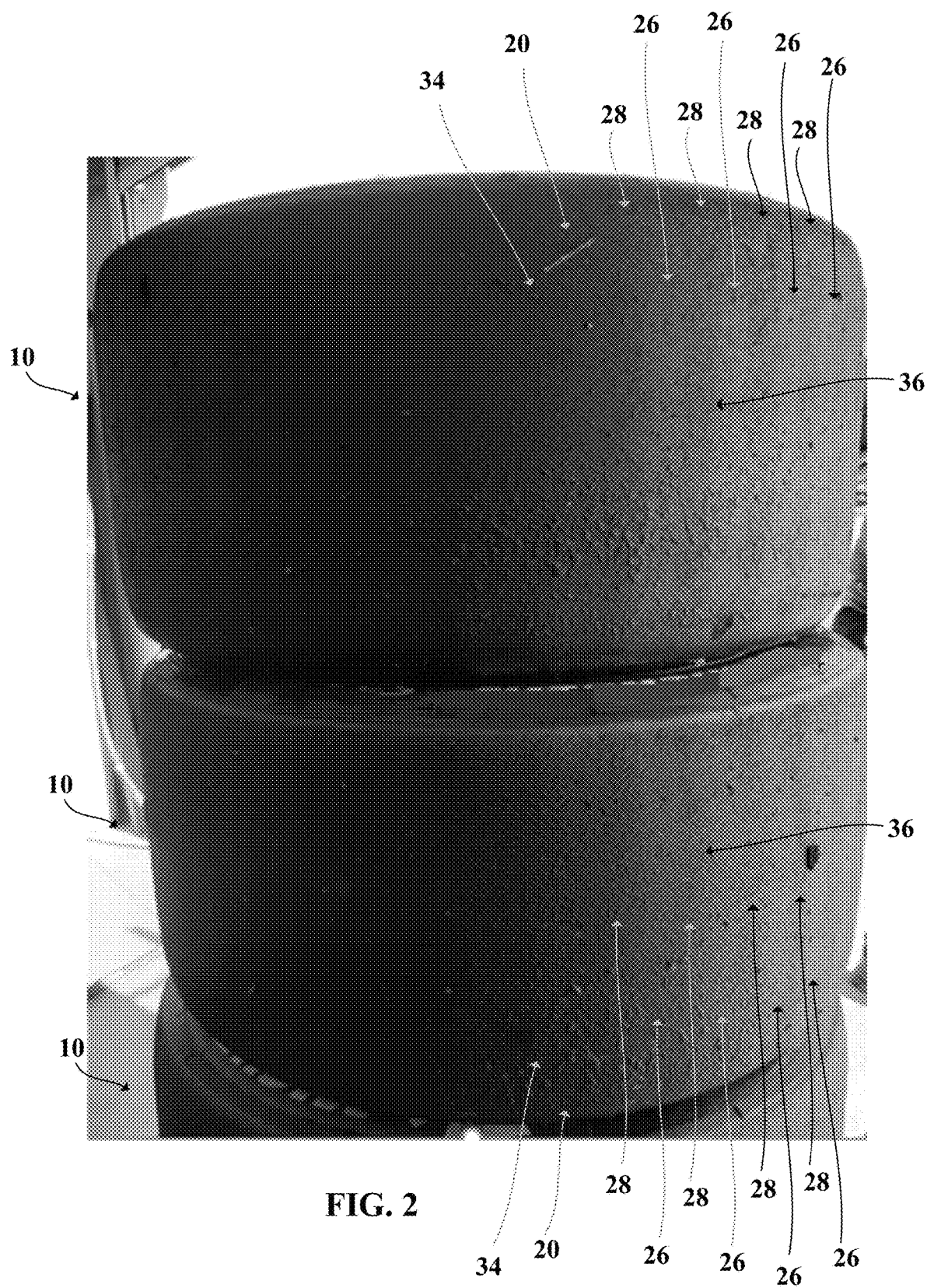
FIG. 2 is a photograph of a stack of several tyres according to the first embodiment.
Figure 5:
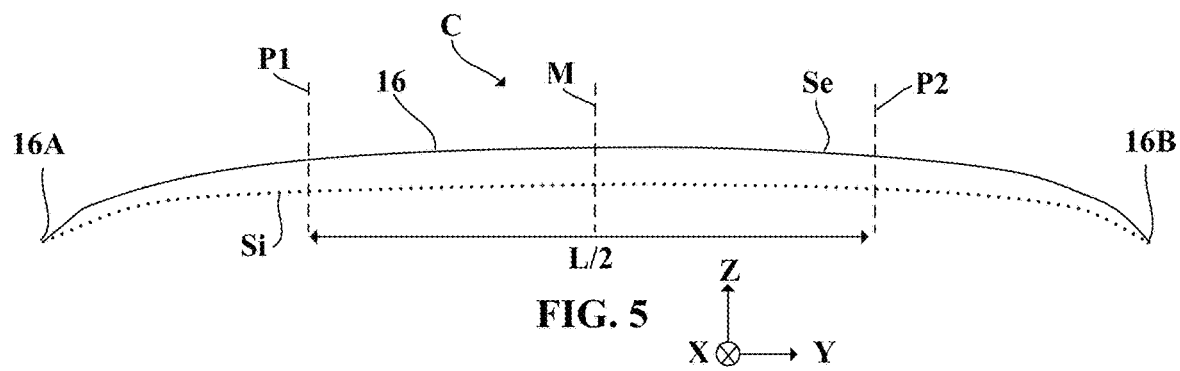
Figure 6:
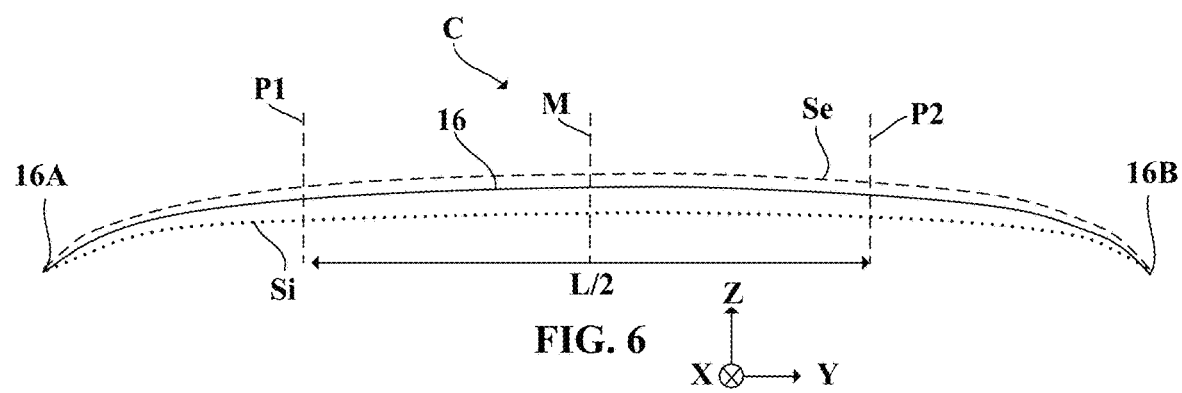
Figure 7:
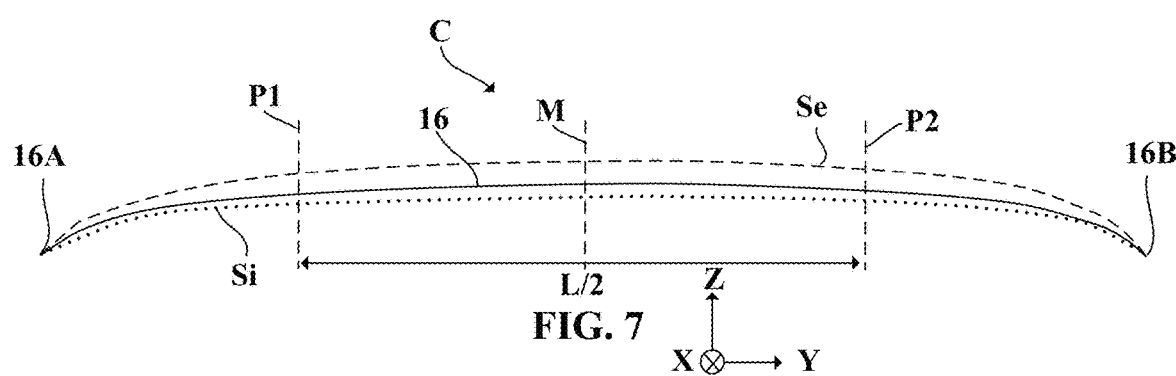
Figure 8:
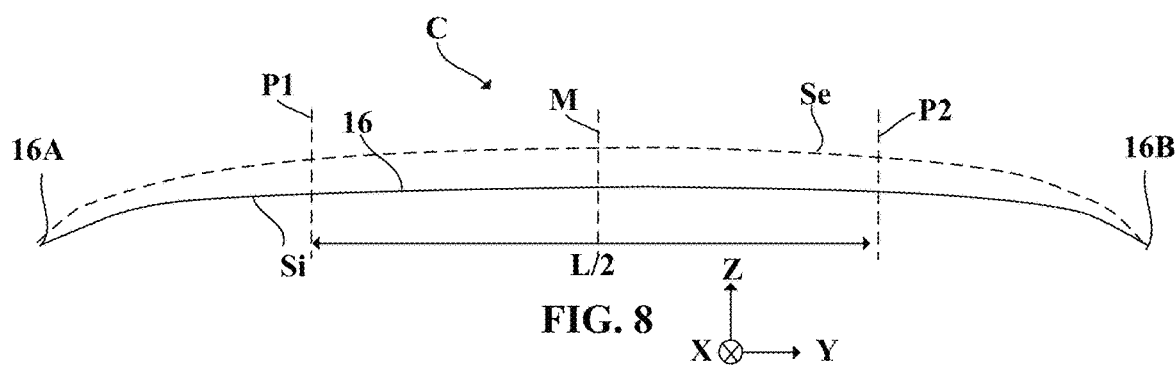

FIGS. 1 to 9 depict one or more competition tyres 10 for use on an asphalted surface according to the first embodiment of the invention. The tyre 10 has a substantially toric shape about an axis of revolution R substantially parallel to the axial direction Y. The tyre 10 is a competition tyre and is intended for a car and has dimensions 30/68 R18. In the various FIGS. 1 and 3 to 9, the tyre 10 is depicted as new, that is, when it has not yet been run. In the photograph of FIG. 2, the tyres are partially worn because they have been used in free running on a racetrack with an asphalted surface.

With reference to FIG. 1, the tyre 10 comprises a crown 12 comprising a tread 14 intended to come into contact with a surface of the ground, during running, via a tread surface 16. The tread surface 16 is delimited by two axial ends 16A and 16B defining a tread-surface axial width L. In this instance L=30 cm. The diameter, in the mid-plane M, of the unladen and uninflated tyre 10 is here equal to 68 cm. The area of the tread surface 16 is equal to 6406 cm$^2$.

The tyre comprises two sidewalls 18 that extend the crown 12 radially inwards. The tyre 10 further comprises two beads radially inwards of the sidewalls 18 and intended to allow the tyre 10 to be secured on a mounting support, for example a wheel rim. Each sidewall 18 connects each bead to the crown 12.

The tread surface 16 of the tyre 10 according to the first embodiment comprises a continuously-smooth part 20 and a plurality of non-smooth parts 22, in this instance eight non-smooth parts 22 of which two may be seen in FIG. 1. In this particular instance, each non-smooth part 22 comprises a tread wear indicator 24 in the form of a well of a diameter equal to 2.5 mm and of a depth comprised between 2 and 5 mm.

The or each continuously-smooth part 20 forms, on the surface, at least 10%, preferably at least 20%, more preferentially at least 30% and more preferably still at least 40% of the tread surface 16.

In the case of a slick tyre comprising one single continuously-smooth part 20, the continuously-smooth part 20 forms, on the surface, at least 80%, preferably at least 90%, and more preferentially at least 95% of the tread surface 16. In this particular instance, the continuously-smooth part 20 forms, on the surface, more than 99% of the tread surface 16.

With reference to FIGS. 1, 2, 3 and 9, the continuously-smooth part 20 comprises a plurality of recessed portions 26 and a plurality of raised portions 28. Each recessed portion 26 of the plurality of recessed portions has a bottom 30 corresponding to that part of each recessed portion 26 that has the smallest transverse radius RT, in this instance RTI. Each raised portion 28 of the plurality of raised portions has a top 32 corresponding to that part of each raised portion 28 that has the greatest transverse radius RT, in this instance RTE.

Each recessed portion 26 of the plurality of recessed portions of the continuously-smooth part 20 and each raised portion 28 of the plurality of raised portions of the continuously-smooth part 20 extends axially over at least 50%, preferably at least 80%, and more preferentially at least 90%, and in this instance over 100%, of the axial width L of the continuously-smooth part 20.

The recessed portions 26 of the plurality of recessed portions and the raised portions 28 of the plurality of raised portions are distributed in a single common repeating pattern over at least a portion of the continuously-smooth part 20, and in this instance over the entirety of the continuously-smooth part 20. In this particular instance and as depicted schematically in FIG. 9, the common repeating pattern is a strip of an axial width substantially equal to the axial width L of the tread surface 16 and of a circumferential curvilinear length l equal to 26.7 mm.

The continuously-smooth part 20 comprises from 2 to 600 recessed portions and from 2 to 600 raised portions, in this instance from 10 to 600 recessed portions and from 10 to 600 raised portions on the continuously-smooth part 20 and in this particular instance 40 recessed portions and 40 raised portions on the continuously-smooth part 20. The continuously-smooth part 20 comprises, on average, from 0.10 to 0.40 recessed portions and from 0.10 to 0.40 raised portions per cm in the circumferential direction X of the continuously-smooth surface 20 and, in this case, on average, 0.18 recessed portions and 0.18 raised portions per cm.

Thus, as may be seen in the photograph of FIG. 2 and as illustrated in FIG. 3, the recessed portions 26 of the plurality of recessed portions and the raised portions 28 of the plurality of raised portions are arranged in such a way as to form an undulating portion 34 of the continuously-smooth part 20. In this particular instance, the continuously-smooth part 20 comprises the undulating portion 34 and in this case consists of the undulating portion 34.

Figure 9:
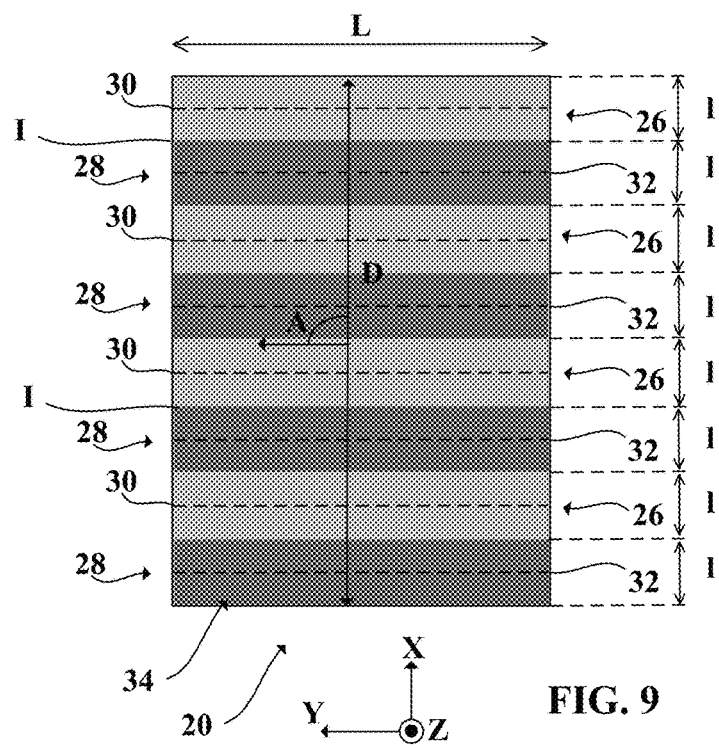
FIG. 9 is a schematic view illustrating the tyre according to the first embodiment.

Here, the undulating portion 34 comprises a single repeating undulation 36 of the continuously-smooth surface 20. The repeating undulation 36 is oriented in a main direction D substantially parallel to the direction of translation from one recessed portion 26 to another of the plurality of recessed portions of the undulating portion 34, or to the direction of translation from one raised portion 28 to another of the plurality of raised portions of the undulating portion 34. The main direction D of the repeating undulation 36 is rectilinear here and makes an angle A greater than or equal to 45°, preferably greater than or equal to 80°, and in this instance substantially equal to 90°, with the axial direction Y of the tyre 10. The repeating undulation 36 here has a constant period. FIGS. 1, 3 and 9 schematically depict the lines of inflection I of the repeating undulation 36 delimiting each recessed portion 26 and each raised portion 28.

As depicted in FIGS. 3 to 8, the undulating portion 34 of the continuously-smooth part 20 is bounded radially between a radially outer surface of revolution Se of axis of revolution substantially coincident with the axis of rotation R of the tyre 10, and a radially inner surface of revolution Si of axis of revolution substantially coincident with the axis of rotation R of the tyre 10.

The radially outer surface of revolution Se passes through the tops 32 of the raised portions 28 of the plurality of raised portions of the continuously-smooth part 20, and the radially inner surface of revolution Si passes through the bottoms 30 of the recessed portions 26 of the plurality of recessed portions of the continuously-smooth part 20. FIGS. 5 to 8 depict the mid-plane M and the two para-sagittal planes P1 and P2 delineating a central portion C having an axial width L/2 equal to 50% of the axial width L of the tread surface 16, the para-sagittal planes P1 and P2 being equidistant from the mid-plane M.

The mean radial distance between the top 32 of each raised portion 28 and the bottom 30 of each recessed portion 26 of the continuously-smooth part 20 ranges from 0.1 mm to 1.5 mm, preferably from 0.2 mm to 1.0 mm and more preferentially from 0.3 mm to 0.7 mm and is here equal to 0.5 mm.

The recessed portions 26 of the plurality of recessed portions and the raised portions 28 of the plurality of raised portions are arranged in such a way that, when the continuously-smooth part 20 rolls along a surface, the mean pressure Pb exerted on average by that surface on the tops 32 of the raised portions 28 of the plurality of raised portions and referred to as the mean top-of-raised-portion pressure, is strictly greater than the mean pressure Pc exerted on average by that surface on the bottoms 30 of the recessed portions 26 of the plurality of recessed portions and referred to as the mean bottom-of-recessed-portion pressure. The pressures exerted by the surface of the ground on each recessed portion 26 of the plurality of recessed portions and on each raised portion 28 of the plurality of raised portions are measured in the contact patch of the continuously-smooth part 20 of the tyre 10 inflated to a reference pressure equal to 1.6 bar and subjected to a reference load equal to 5000 N and running at a speed equal to 100 mm/sec with substantially zero slip and camber angles. In this particular instance, Pb=3.0 bar and Pc=1.0 bar. Here, any contact patch obtained for the tyre 10 under the above conditions has at least 2 recessed portions and 2 raised portions.

The ratio of the mean top-of-raised-portion pressure Pb to the mean bottom-of-recessed-portion pressure Pc is greater than or equal to 1.5, preferably greater than or equal to 2.0 and more preferentially greater than or equal to 2.5 and less than or equal to 14.0, preferably less than or equal to 10.0 and more preferentially less than or equal to 7.0. In this instance, Pb/Pc=3.0.

Figure 10:
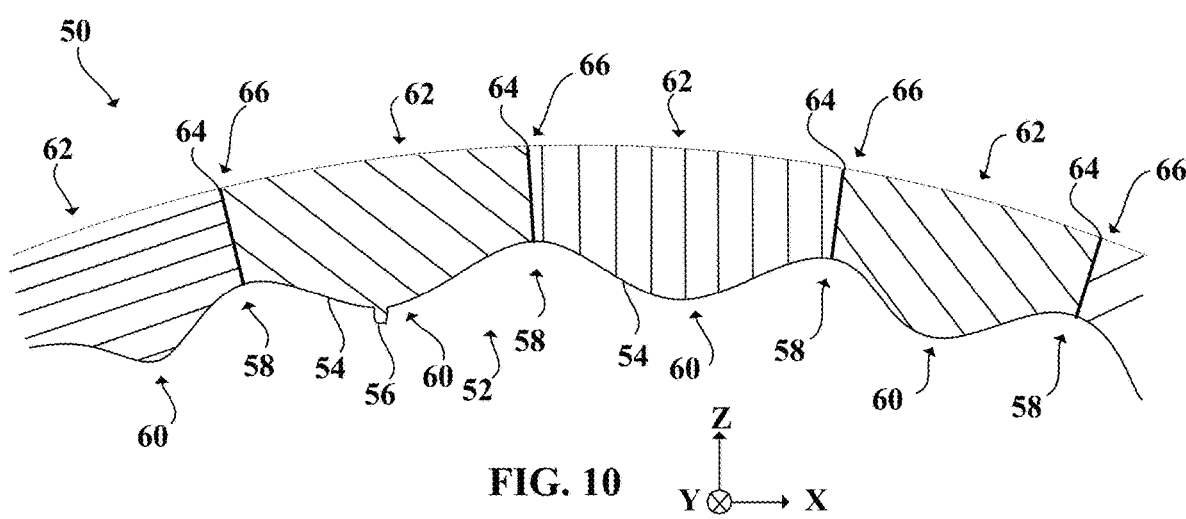
FIG. 10 is a schematic view of a mould according to the invention capable of moulding the tyre of FIGS. 1 to 9, FIGS. 11, 12 and 13 are views similar to that of FIG. 9 of tyres respectively according to second, third and fourth embodiments of the invention.

FIG. 10 depicts a mould 50 for manufacturing the tyre 10 described above The mould 50 comprises a moulding surface 52 that complements the tread surface 16, comprising a continuously-smooth moulding part 54 for moulding the continuously-smooth part 20, and a non-smooth moulding part 56 for moulding the non-smooth parts 22. The continuously-smooth moulding part 54 comprises a plurality of recesses 58 for moulding the raised portions 28 of the plurality of raised portions, and a plurality of raised portions 60 for moulding the recessed portions 26 of the plurality of recessed portions.

The mould 50 comprises a plurality of individual elements 62 for moulding the tread surface 16, these being able to collaborate in pairs along parting lines 64.

The mould 50 comprises a plurality of venting elements 66 for venting from the mould any air that is trapped between the moulding surface 52 and the tread surface 16 when the tyre 10 is in the mould 50. The plurality of venting elements 66 comprises a part of the venting elements 66 that comprises the parting lines 64. Each parting line 64 opens radially on to one of the moulding recesses 58 and each moulding recess 58 has a parting line 64 opening into said moulding recess 58. It is also possible to envisage for the plurality of venting elements 66 to comprise another part of the venting elements 66 that comprises venting ducts formed in each of the individual elements 62 (not depicted).

Competition tyres for race cars according to the second to eighth embodiments will now be described with reference to FIGS. 11 to 18. Elements similar to those described with reference to the first embodiment are denoted by identical references.

In the second embodiment illustrated in FIG. 11, and unlike in the first embodiment, the repeating undulation 36 is oriented in a main direction D that makes with the axial direction Y an angle A that is substantially zero.

In the third embodiment illustrated in FIG. 12, and unlike in the first embodiment, the repeating undulation 36 is oriented in a main direction D that makes with the axial direction Y an angle A that is equal to 45°.

Figure 13:
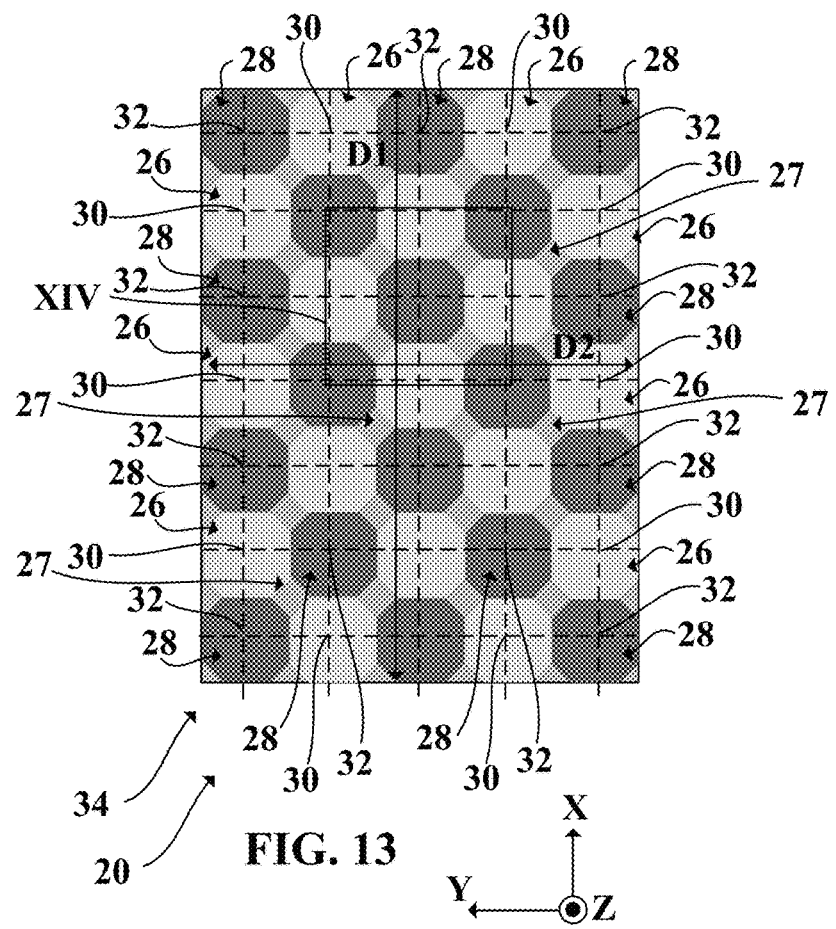
Figure 14:
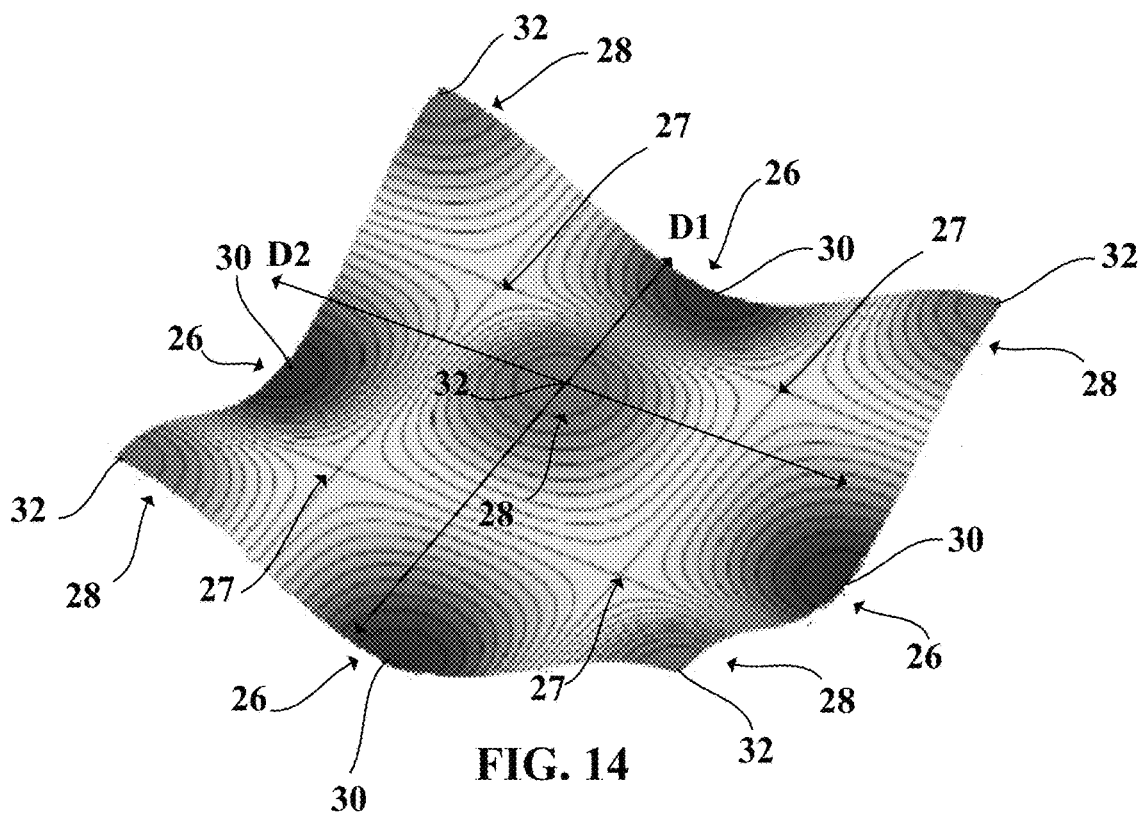
FIG. 14 is a detail view of the region XIV of FIG. 13, FIGS. 15, 16, 17 and 18 are views similar to that of FIG. 9 of tyres respectively according to fifth, sixth, seventh and eighth embodiments of the invention.

In the fourth embodiment illustrated in FIGS. 13 and 14, and unlike in the first embodiment, the undulating portion 34 comprises first and second repeating undulations. The first repeating undulation is, in a similar way to the first embodiment, oriented in a main direction D1 that makes with the axial direction Y an angle that is substantially equal to 90°. The second repeating undulation is, in a similar way to the second embodiment, oriented in a main direction D2, different from the main direction D1, that makes with the axial direction Y an angle that is substantially zero. Furthermore, in addition to comprising recessed portions 26 and raised portions 28, the undulating portion 34 comprises median portions 27 on a median surface of revolution of axis of revolution substantially coincident with the axis of rotation R of the tyre 10, the median surface of revolution being substantially equidistant from the radially inner surface of revolution Si and radially outer surface of revolution Se.

Figure 15:
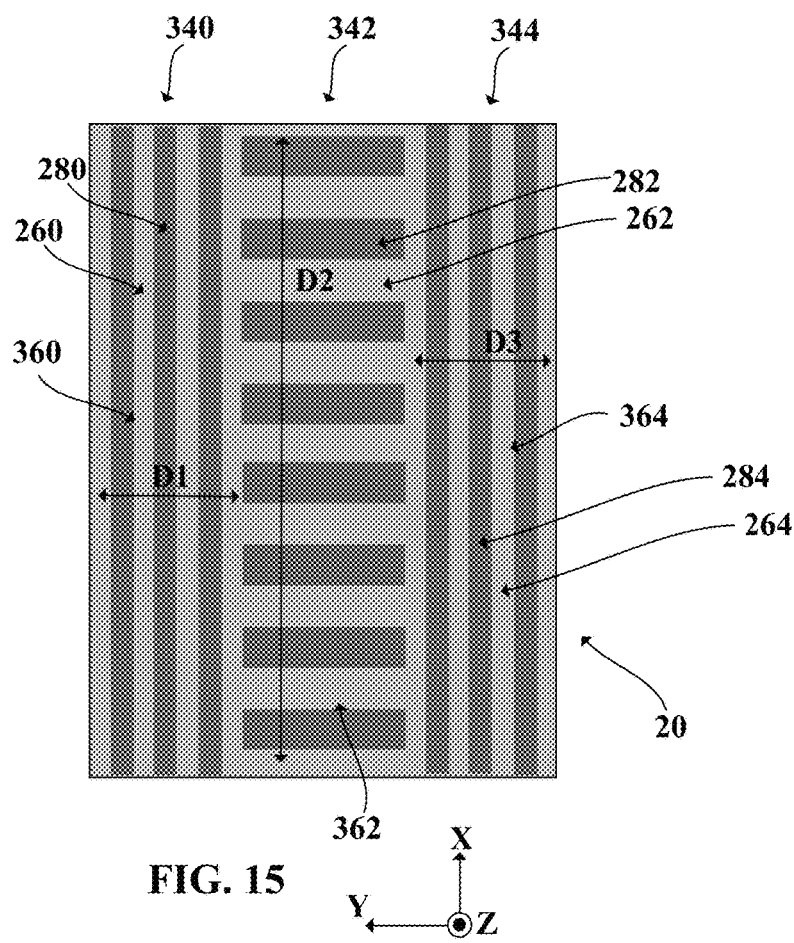

In the fifth embodiment illustrated in FIG. 15 and unlike in the first embodiment, the continuously-smooth surface 20 comprises first, second and third undulating portions denoted respectively by the references 340, 342, 344.

The recessed portions 26 of the plurality of recessed portions are distributed respectively in a first, a second and a third repeating pattern of recessed portions on each first, second and third undulating portion 340, 342 and 344. The raised portions 28 of the plurality of raised portions are distributed respectively in a first, a second and a third repeating pattern of raised portions on each first, second and third undulating portion 340, 342 and 344, these repeating patterns being respectively identical to each first, second and third repeating pattern of recessed portions. Thus, the recessed portions 26 of the plurality of recessed portions and the raised portions 28 of the plurality of raised portions are distributed in a first, a second and a third common repeating pattern over, respectively, each first, second and third undulating portion 340, 342, 344 of the continuously-smooth part 20.

Each first and third undulating portion 340, 344 comprises a repeating undulation 360, 364, which is oriented in a respective main direction D1, D3 that makes with the axial direction Y an angle that is substantially zero. The second undulating portion 342 comprises a repeating undulation 362 which is oriented in a main direction D2 that makes with the axial direction Y an angle that is substantially equal to 90°.

Figure 16:
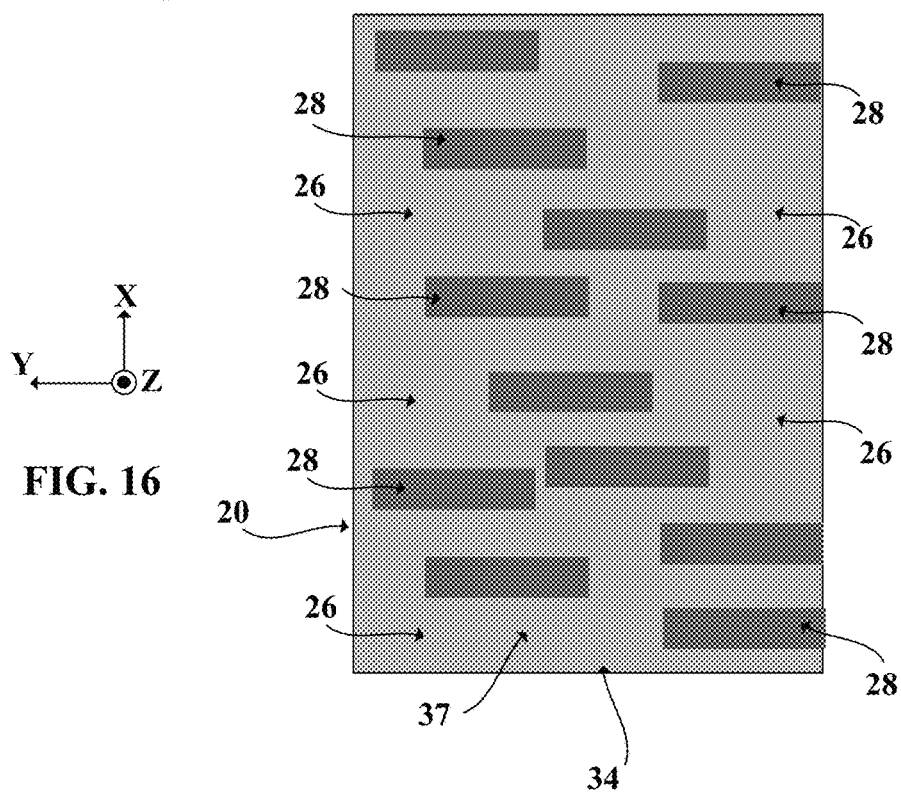

In the sixth embodiment illustrated in FIG. 16, and unlike in the first embodiment, only the raised portions 28 of the plurality of raised portions are distributed in a repeating pattern of raised portions on the continuously-smooth part 20. The recessed portions 26 of the plurality of recessed portions are distributed randomly over the continuously-smooth part 20. The undulating portion 34 therefore comprises a random undulation 37.

Figure 17:
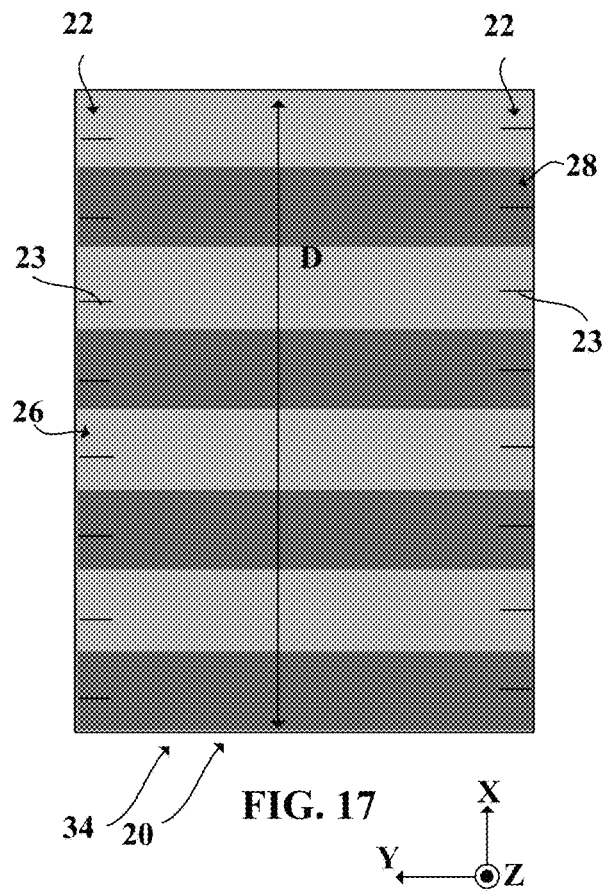

In the seventh embodiment illustrated in FIG. 17, and unlike in the first embodiment, each non-smooth part 22 comprises not tread wear indicators but cuts 23, in this instance cuts which have been moulded in the form of vents used for removing air trapped between the tyre curing mould and the tread surface 16 during the tyre manufacturing process.

Figure 18:
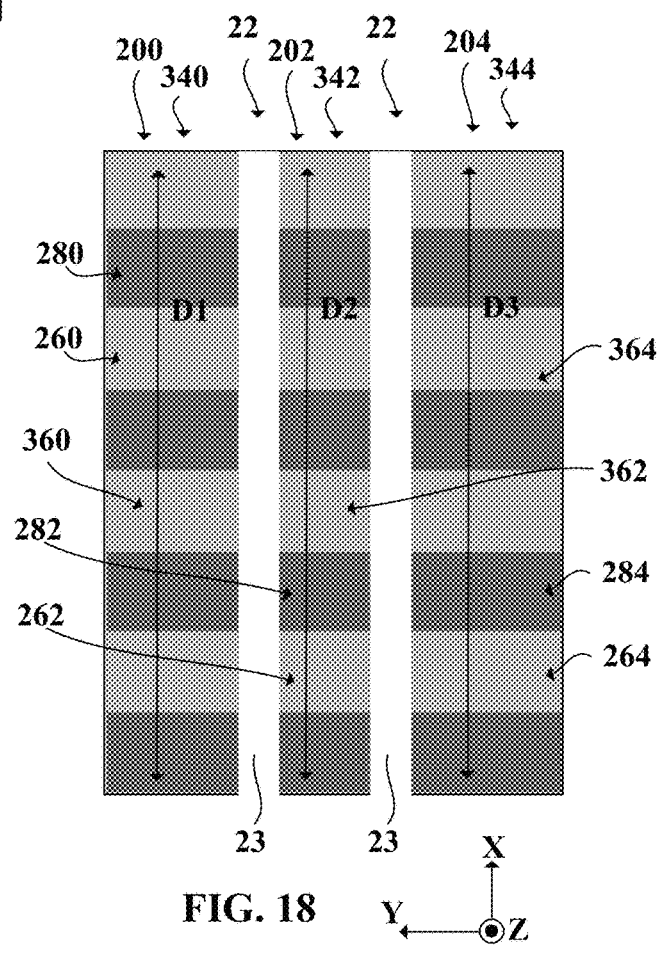

In the eighth embodiment illustrated in FIG. 18 and unlike in the first embodiment, the tread surface 16 comprises first, second and third continuously-smooth parts 200, 202, 204. The recessed portions 260, 262, 264 of the plurality of recessed portions and the raised portions 280, 282, 284 of the plurality of raised portions of each first, second and third continuously-smooth part 200, 202, 204 are respectively arranged in such a way as to form a first, a second and a third undulating portion 340, 342, 344 of each first, second and third continuously-smooth part 200, 202, 204. Each first, second and third undulating portion 340, 342, 344 comprises a respective repeating undulation 360, 362, 364, which is oriented in a respective main direction D1, D2, D3 that makes with the axial direction Y an angle that is substantially equal to 90°.

Furthermore, the tread surface 16 comprises non-smooth parts 22 comprising not tread wear indicators but cuts 23, in this instance cuts for removing or storing water and here comprising circumferential cuts.

Figure 19:
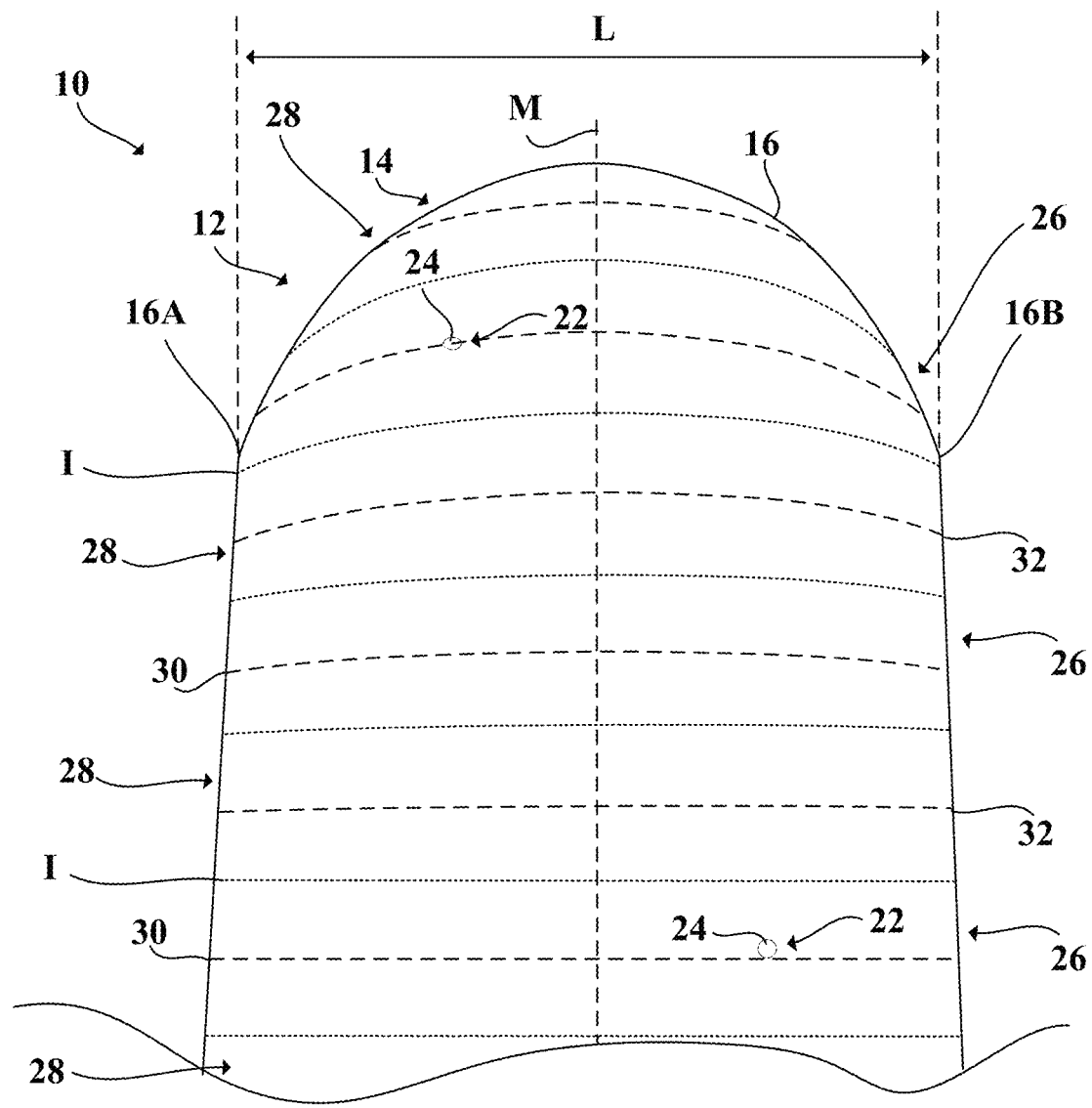
FIG. 19 is a face-on view of a competition motorbike tyre according to one embodiment of the invention.

FIG. 19 schematically depicts a competition motorbike tyre 10 according to the invention, similar to the competition race car tyre 19 according to the first embodiment. In the case of the tyre 10 of FIG. 19, the tyre 10 is characterized as running at a speed equal to 100 mm/sec with substantially zero slip and camber angles, the tyre 10 being inflated to a reference pressure equal to 1.8 bar and subjected to a reference load equal to 1500 N.

Throughout all of the embodiments described hereinabove and in accordance with the invention, the tyres are used in competition or in free running on a racetrack with an asphalted surface.

The invention is not limited to the embodiments described above.

The invention claimed is:

1. A tire for a motor car or a motorbike for use on an asphalted surface, the tire comprising a tread surface comprising one or more continuously-smooth parts, and the or each continuously-smooth part comprising:
    a plurality of recessed portions, each recessed portion of the plurality of recessed portions comprising a recessed-portion bottom; and
    a plurality of raised portions each raised portion of the plurality of raised portions comprising a raised-portion top,
    wherein the recessed portions and the raised portions are arranged in such a way that, when the or each continuously-smooth part rolls along a surface, a mean top-of-raised-portion pressure Pb exerted on average by the surface on the raised-portion tops of the raised portions is strictly greater than a mean bottom-of-recessed-portion pressure Pc exerted on average by the surface on the recessed-portion bottoms of the recessed portions, the mean bottom-of-recessed-portion pressure Pc being nonzero, and
    wherein the pressure exerted by the surface on each recessed portion and on each raised portion is measured in a contact patch of the or each continuously-smooth part, the tire running at a speed equal to 100 mm/sec with substantially zero slip and camber angles, and the tire being inflated to a reference pressure equal to 1.6 bar, and subjected to a reference load equal to 5000 N in the case of a car or the tire being inflated to a reference pressure equal to 1.8 bar, and subjected to a reference load equal to 1500 N in the case of a motorbike.

2. The tire according to claim 1, wherein the or each continuously-smooth part forms, on the surface, at least 10% of the tread surface.

3. The tire according to claim 1, wherein the or a totality of continuously-smooth parts forms, on the surface, at least 80% of the tread surface.

4. The tire according to claim 1, wherein a ratio of the mean top-of-raised-portion pressure Pb to the mean bottom-of-recessed-portion pressure Pc is greater than or equal to 1.5.

5. The tire according to claim 1, wherein a ratio of the mean top-of-raised-portion pressure Pb to the mean bottom-of-recessed-portion pressure Pc is less than or equal to 14.0.

6. The tire according to claim 1, wherein each recessed portion and each raised portion extends axially over at least 50% of the continuously-smooth part.

7. The tire according to claim 1, wherein the recessed portions are distributed in at least one repeating pattern of recessed portions over at least a portion of the continuously-smooth part and/or the raised portions are distributed in at least one repeating pattern of raised portions over at least a portion of the continuously-smooth part.

8. The tire according to claim 1, wherein the recessed portions and the raised portions are arranged in such a way as to form at least one undulating portion of the continuously-smooth part.

9. The tire according to claim 1, wherein the recessed portions and the raised portions are distributed in a single common repeating pattern over at least a portion of the continuously-smooth part.

10. The tire according to claim 9, wherein the recessed portions and the raised portions are arranged in such a way as to form at least one undulating portion of the continuously-smooth part, and
    wherein the or each undulating portion comprises at least one repeating undulation of the continuously-smooth surface, the or each repeating undulation being oriented in a main direction substantially parallel to a direction of translation from one recessed portion to another of the plurality of recessed portions of the undulating portion, or to a direction of translation from one raised portion to another of the plurality of raised portions of the undulating portion, the recessed portions and raised portions being distributed in the single common repeating pattern.

11. The tire according to claim 10, wherein, with the main direction of the or each repeating undulation being substantially rectilinear, the main direction of the or each repeating undulation makes an angle greater than or equal to 45° with an axial direction of the tire.

12. A mold for manufacturing a tire according to claim 1, the mold comprising a molding surface for molding the tread surface comprising a continuously-smooth molding part for molding the or each continuously-smooth part of the tread surface, the or each continuously-smooth molding part comprising:
- a plurality of recesses for molding the raised portions of the continuously-smooth part of the tread surface; and
- a plurality of raised portions for molding the recessed portions of the continuously-smooth part of the tread surface.

13. The mold according to claim 12, further comprising a plurality of venting elements for venting from the mold any air that is trapped between a molding surface and the tread surface when the tire is in the mold, each venting element of at least part of the venting elements opening radially into one of the molding recesses.

14. The mold according to claim 13, wherein each molding recess has at least one venting element of at least part of the venting elements opening into the molding recess.

\* \* \* \* \*